US008208845B2

(12) United States Patent
Hanano

(10) Patent No.: US 8,208,845 B2
(45) Date of Patent: Jun. 26, 2012

(54) BEARING STRUCTURE, TONER STORAGE DEVICE AND IMAGE FORMING APPARATUS PROVIDED WITH THE BEARING STRUCTURE

(75) Inventor: Susumu Hanano, Osaka (JP)

(73) Assignee: Kyocera Mita Corporation (JP)

( * ) Notice: Subject to any disclaimer, the term of this patent is extended or adjusted under 35 U.S.C. 154(b) by 457 days.

(21) Appl. No.: 12/486,192

(22) Filed: Jun. 17, 2009

(65) Prior Publication Data

US 2009/0317026 A1 Dec. 24, 2009

(30) Foreign Application Priority Data

Jun. 19, 2008 (JP) ................................ 2008-160339

(51) Int. Cl.
*G03G 15/00* (2006.01)
*G03G 21/00* (2006.01)
*G03G 21/10* (2006.01)
*F16C 3/14* (2006.01)

(52) U.S. Cl. ......... 399/358; 384/271; 399/256; 399/263

(58) Field of Classification Search .................. 399/254, 399/256, 258, 263, 358; 384/120, 279, 371, 384/372, 385, 387, 397

See application file for complete search history.

(56) References Cited

U.S. PATENT DOCUMENTS

| | | | | |
|---|---|---|---|---|
| 3,724,918 | A * | 4/1973 | Reinhoudt | 310/90.5 |
| 3,951,476 | A * | 4/1976 | Schulien et al. | 384/385 |
| 5,617,195 | A * | 4/1997 | Torimaru et al. | 399/27 |
| 5,715,502 | A * | 2/1998 | Taniguchi et al. | 399/256 |
| 6,517,247 | B2 * | 2/2003 | Cheng | 384/279 |
| 6,668,150 | B2 * | 12/2003 | Toyoda et al. | 399/325 |
| 7,369,797 | B2 * | 5/2008 | Yoshida et al. | 399/256 |
| 7,801,466 | B2 * | 9/2010 | Hirose | 399/256 |
| 2006/0165327 | A1 * | 7/2006 | Chen et al. | 384/397 |
| 2008/0031666 | A1 | 2/2008 | Tawada | |

FOREIGN PATENT DOCUMENTS

| | | | |
|---|---|---|---|
| CN | 2833219 | | 11/2006 |
| JP | 61065282 | A * | 4/1986 |
| JP | 03014915 | A * | 1/1991 |
| JP | 7253706 | | 10/1995 |
| JP | 2008-039865 | | 2/2008 |

* cited by examiner

*Primary Examiner* — David Gray
*Assistant Examiner* — Fred L Braun
(74) *Attorney, Agent, or Firm* — Gerald E. Hespos; Michael J. Porco

(57) ABSTRACT

A rotary member includes a rotary shaft with a flange that projects radially out from a position near an end of the rotary shaft. A shaft end portion of the rotary shaft projects longitudinally beyond the flange and has a lubricant filling hole for receiving a lubricant. The rotary member also includes a bearing with a wall surface that has a recess. The recess has an opening and a closed depth end. The shaft end portion is accommodated in the recess so that the flange contacts the wall surface and closes off the recess to define a substantially closed space that can retain lubricant.

9 Claims, 4 Drawing Sheets

BEARING STRUCTURE, TONER STORAGE DEVICE AND IMAGE FORMING APPARATUS PROVIDED WITH THE BEARING STRUCTURE

BACKGROUND OF THE INVENTION

1. Field of the Invention

The present invention relates to a bearing structure applicable to a rotary member, such as a roller-like member, as well as to a toner storage device and an image forming apparatus provided with the bearing structure.

2. Description of the Related Art

In image forming apparatuses using electrophotographic technology, such as copying machines and printers, photosensitive drums are wide used as image carrying members. Generally, image forming operation performed by using a photosensitive drum is as follows. A charging device uniformly charges a surface of the photosensitive drum to a specific electric potential and an exposure unit projects a light beam emitted from a light emitting diode (LED) onto the surface of the photosensitive drum. The electric potential of the surface of the photosensitive drum is attenuated in areas exposed to the light beam, whereby an electrostatic latent image of an original image is formed on the drum surface. A developing unit develops the electrostatic latent image, thereby forming a toner image on the surface of the photosensitive drum. The toner image is transferred to a sheet of paper when the sheet is passed through an image transfer area where the photosensitive drum is held in contact with or in close proximity with a transfer roller.

An image forming apparatus includes a number of rotary members which rotate about longitudinal axes thereof, such as a photosensitive drum, a development roller, a cleaning roller, a fixing roller, a toner transporting screw and a sheet transport roller. Performance of these members as rotating elements, or rotational performance thereof, exerts a direct influence on various performance capabilities of the apparatus, such as image forming capability, toner image fixing capability, toner transporting capability and sheet transporting capability. It is therefore important to smoothly rotate the rotary members. For this purpose, each of the rotary members is provided with bearing structures at ends of a rotary shaft thereof for supporting the rotary shaft to permit the rotary member to smoothly rotate about the longitudinal axis.

Japanese Unexamined Patent Publication No. 2008-39865 describes a waste toner collection container provided with an example of the aforementioned kind of bearing structure. This waste toner collection container contains a transporting screw and has a bearing structure which includes a through hole formed in the container so that a rotary shaft of the transporting screw is fitted in the through hole. Generally, the bearing structure includes such functional elements as ball bearings to provide satisfactory rotational performance. Nevertheless, bearing structures with simplified arrangements, such as those employing through holes like the one mentioned above or recesses formed in walls of a housing for fitting ends of rotary shafts for the sake of compact design and cost reduction without using the functional elements, are used quite often in practice.

There are cases where a lubricant like grease is used in the bearing structure to improve the rotational performance thereof. The use of the lubricant serves to smoothen sliding motion of the rotary shafts, enhance wear resistance thereof and prevent generation of unpleasant noise. For example, there is a case where a lubricant is injected into or applied to a recess formed in a wall of a housing which supports an end of a rotary shaft of a rotary member during a process of assembling an apparatus.

On the other hand, however, there is a possibility that the lubricant leaks from the recess in the wall which supports the end of the rotary shaft, resulting in a shortage of the lubricant. The shortage of the lubricant can worsen the sliding motion of the rotary shaft and cause generation of unpleasant noise. Additionally, leakage of the lubricant to undesired areas can potentially smear a curved outer surface of a roller-like member or a sheet of paper or contaminate a large quantity of toner collected from the surface of the photosensitive drum prior to development. Particularly if the lubricant leaks to an area where a large quantity of toner is present, the toner will gather into a mass or stick to that area, potentially causing such problems as an increase in torque required for rotating the rotary member or lockup of rotation thereof.

SUMMARY OF THE INVENTION

It is an object of the invention to provide a compact and low-cost bearing structure capable of providing stable lubricating performance.

In one aspect of the invention, a bearing structure for a rotary member intended to achieve the above object includes a rotary shaft provided in the rotary member, a flange formed at an end portion of the rotary shaft, the flange having a portion projecting radially outward from the rotary shaft, a shaft end portion projecting from the rotary shaft longitudinally outward beyond the flange, a lubricant filling hole formed in the shaft end portion, and a bearing supporting the rotary member rotatably about the rotary shaft, the bearing including a recess capable of accommodating the shaft end portion and a wall portion with which the flange is placed in contact.

In another aspect of the invention, a toner storage device includes a toner transporting screw having a rotary shaft and a screw portion which rotates about a longitudinal axis thereof as a result of rotation of the rotary shaft for transporting toner in a longitudinal direction, a flange formed at an end portion of the rotary shaft, the flange having a portion projecting radially outward from the rotary shaft, a shaft end portion projecting from the rotary shaft longitudinally outward beyond the flange, a lubricant filling hole formed in the shaft end portion, and a housing accommodating the toner transporting screw, the housing having an inside wall surface facing the shaft end portion and a recess formed by hollowing out part of the inside wall surface of the housing for accommodating the shaft end portion, wherein part of the flange is in contact with part of the inside wall surface surrounding the recess.

In still another aspect of the invention, an image forming apparatus includes an image carrying member on which a toner image is formed, and a toner storage device for storing toner, wherein the toner storage device is configured in the same way as the aforementioned toner storage device.

These and other objects, features and advantages of the invention will become more apparent upon a reading of the following detailed description in conjunction with the accompanying drawings.

DETAILED DESCRIPTION OF THE PREFERRED EMBODIMENTS

Figure 1:
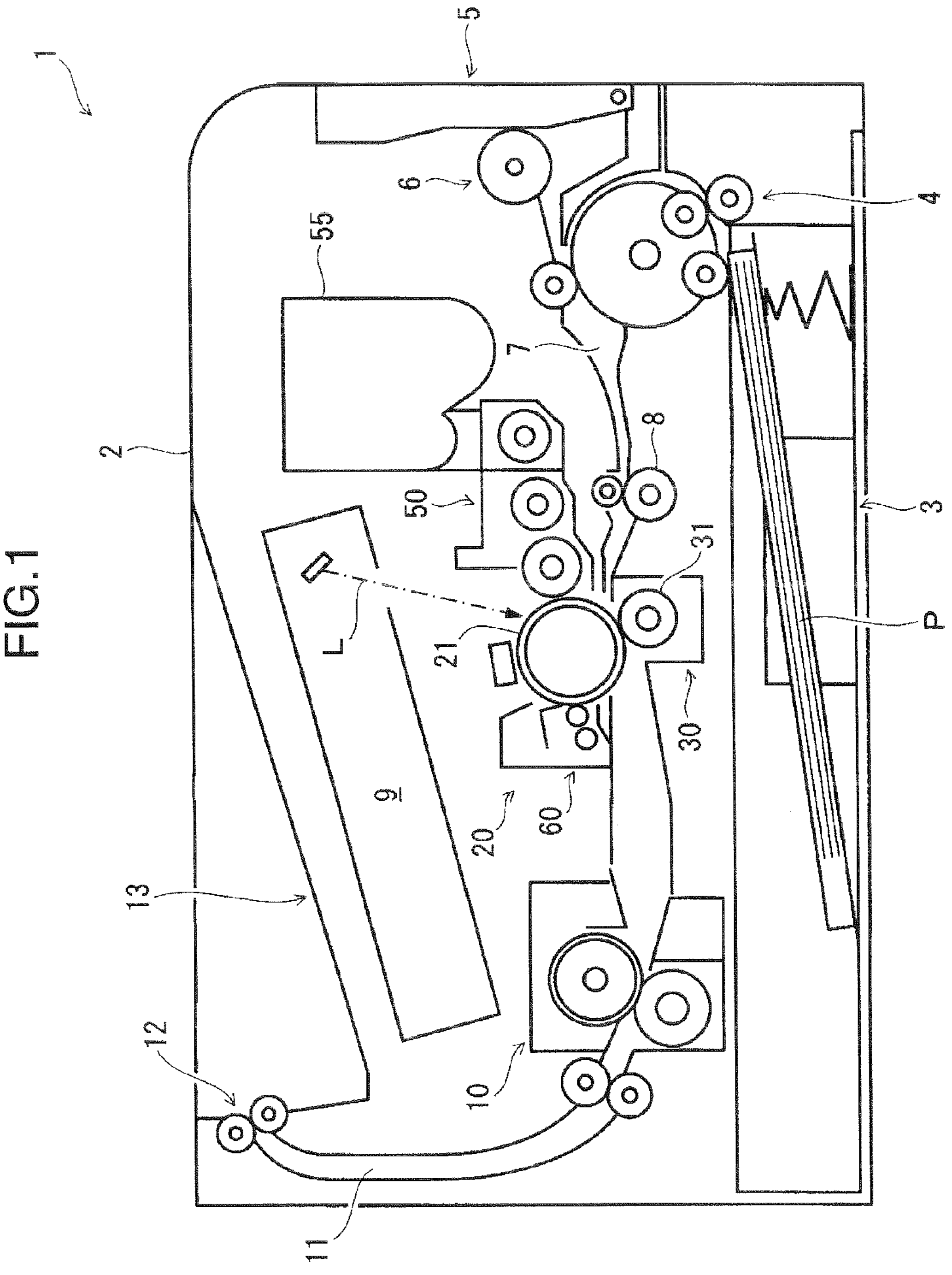
FIG. 1 is a schematic cross-sectional view generally showing the structure of a printer provided with a bearing structure according to a preferred embodiment of the invention.

A preferred embodiment of the present invention is now described with reference to FIGS. 1 to 5. First, an image forming apparatus provided with a bearing structure of the embodiment of the invention is described along with image forming operation performed by the apparatus referring to FIG. 1 which is a schematic cross-sectional view generally showing the structure of a printer 1, an example of the image forming apparatus. As illustrated in FIG. 1, a right side corresponds to a front side of the printer 1 and a left side corresponds to a rear side of the same.

The printer 1 has an apparatus body 2 incorporating a paper cassette 3 at a bottom part thereof, the paper cassette 3 holding stacked printing sheets P. Provided above a downstream end in a sheet feeding direction of the paper cassette 3 is a sheet feeding mechanism 4 which picks up and feeds each successive printing sheet P from the paper cassette 3 in an upper-right direction (as illustrated in FIG. 1). The paper cassette 3 can be removed by horizontally pulling the same out of the apparatus body 2 in a frontward direction thereof (rightward direction as illustrated in FIG. 1) and reinstated in the apparatus body 2 by pushing the paper cassette 3 in the opposite direction.

A manual feed tray 5 is provided in a middle part of the front side of the apparatus body 2 of the printer 1. The manual feed tray 5 is made swingable up and down about a pivot shaft provided at a lower end of the manual feed tray 5, the pivot shaft extending generally horizontally in a lateral direction. The manual feed tray 5 can be opened by pulling an upper end thereof to swing the manual feed tray 5 outward (rightward as illustrated in FIG. 1) about the pivot shaft and can be closed by swinging the manual feed tray 5 in the opposite direction. When the manual feed tray 5 is opened, a user can place a printing sheet P on top of the manual feed tray 5 for manually feeding the printing sheet P.

The manual feed tray 5 is used when printing an image on such recording media as sheets of paper of a different size which are not held in the paper cassette 3, sheets of thick paper or transparent sheets of film for an overhead projector. Such non-standard printing sheets are placed one by one on the manual feed tray 5 and fed successively leftward by a feeding mechanism 6 which is provided to the left of the manual feed tray 5 as illustrated in FIG. 1. When not in use, the manual feed tray 5 is set at a closed position as shown in FIG. 1.

Provided downstream in the sheet feeding direction of the paper cassette 3 and the manual feed tray 5 are a sheet feeding path 7, registration rollers 8, an image-forming portion 20 and an image transfer portion 30. The printing sheet P fed from the paper cassette 3 or the manual feed tray 5 passes through the sheet feeding path 7 and reaches the registration rollers 8 which align the printing sheet P to make up for any oblique feed thereof and feed the printing sheet P into the image transfer portion 30 such that a toner image formed by the image-forming portion 20 would be transferred to the printing sheet P with correct timing.

The printer 1 includes an optical system 9 located above the image-forming portion 20. The optical system 9 produces a laser beam L (shown by a dot-and-dash line in the Figure) based on an image data signal representative of text and/or graphic information externally fed from a computer (not shown) to the printer 1. Then, the image-forming portion 20 produces an electrostatic latent image of an original image on a photosensitive drum 21 which serves an image carrying member. The electrostatic latent image is converted into the aforementioned toner image. Then, the toner image is transferred to the printing sheet P fed with proper timing by the registration rollers 8 at an image transfer nipping part where the photosensitive drum 21 is pressed against a transfer roller 31 of the image transfer portion 30.

Provided downstream in the sheet feeding direction of the image-forming portion 20 and the image transfer portion 30 is a fixing unit 10. The printing sheet P carrying the unfixed toner image is fed into the fixing unit 10 in which the toner image is fixed to the printing sheet P by application of heat and pressure between a heating roller and a pressure roller.

Provided further downstream of the fixing unit 10 are a sheet output path 11, a sheet output port 12 and a sheet output tray 13. The printing sheet P ejected from the fixing unit 10 is transported upward along the sheet output path 11 and delivered onto the sheet output tray 13 provided at the top of the apparatus body 2 through the sheet output port 12.

Figure 2:
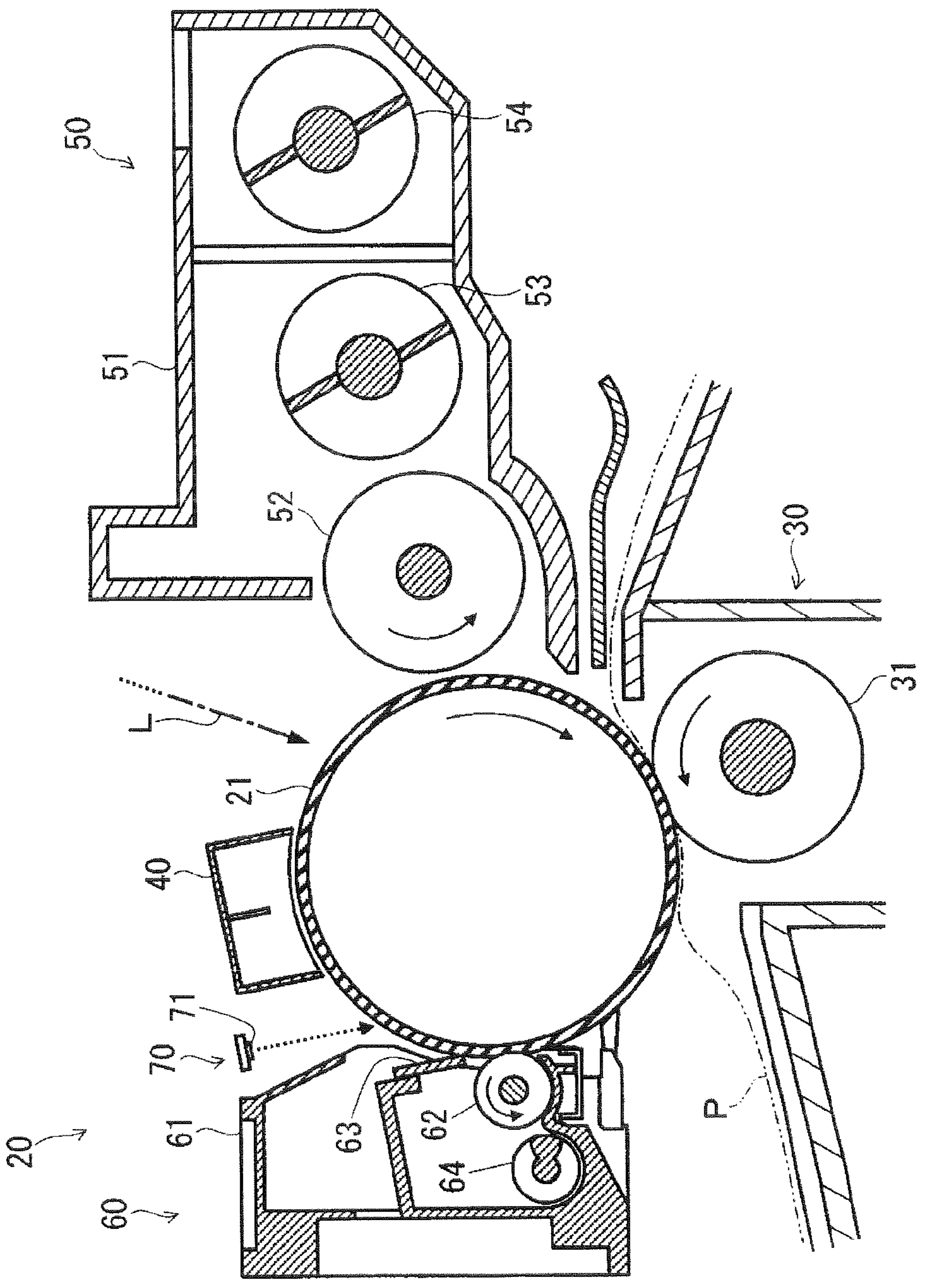
FIG. 2 is an enlarged cross-sectional view showing a portion around an image-forming portion of the printer of FIG. 1.

Described next with reference to FIGS. 1 and 2 are details of the structure of a portion around the image-forming portion 20 of the printer 1 and the operation thereof. FIG. 2 is an enlarged cross-sectional view showing the portion around the image-forming portion 20. The photosensitive drum 21 serving as the image carrying member is located approximately in the middle of the image-forming portion 20. Provided close to the photosensitive drum 21 are a charging unit 40, a developing unit 50, a cleaning unit 60 and a static charge eliminating unit 70 which are disposed in this order along a rotating direction of the photosensitive drum 21. The image transfer portion 30 is located between the developing unit 50 and the cleaning unit 60 as if along the rotating direction of the photosensitive drum 21.

The photosensitive drum 21 has a longitudinal axis extending horizontally in a sheet width direction which is perpendicular to the sheet feeding direction in the printer 1, or perpendicular to the plane of paper of FIG. 2. The photosensitive drum 21 is an inorganic photoreceptor drum having an electrically conductive roller core member made of aluminum, for instance, and a photosensitive layer of amorphous silicon which is an inorganic photoconductive material deposited on an outer surface of the roller core member by vacuum evaporation or the like. As an alternative, the photosensitive drum 21 may be a drum employing an organic photoconductor (OPC). The photosensitive drum 21 is driven by an unillustrated driver in such a manner that an outer peripheral surface of the photosensitive drum 21 turns at a speed equal to a sheet feeding speed.

The charging unit 40 is a scorotron charger which uses corona discharge. Alternatively, the charging unit 40 may be a corotron charger which also uses corona discharge or a contact-type charger using a charging roller or a brush, for instance. The charging unit 40 uniformly charges the outer peripheral surface of the photosensitive drum 21 to a specific electric potential of a particular polarity.

The developing unit 50 has a housing 51 incorporating a development roller 52, a transporting screw 53 and an agitating screw 54. The development roller 52 is of a contact or noncontact development type disposed in the proximity of the photosensitive drum 21. A bias of the same polarity as the charging polarity of the photosensitive drum 21 is applied to the development roller 52. The development roller 52 thus biased imparts an electric charge to toner used as a developer. The electrostatic latent image on the outer peripheral surface of the photosensitive drum 21 is developed as electrically charged toner particles move to the surface of the photosensitive drum 21. The toner is initially stored in a toner feeding container 55 provided above the developing unit 50 as shown in FIG. 1 and is supplied into the housing 51 from above the agitating screw 54 by means of an unillustrated toner feeder. The toner supplied to the housing 51 is transported up to the development roller 52 by the agitating screw 54 and the transporting screw 53 while being agitated.

The image transfer portion 30 includes the aforementioned transfer roller 31 which serves as an image transfer member. The transfer roller 31 is pressed against the photosensitive drum 21 to form the image transfer nipping part through which the printing sheet P is passed. The transfer roller 31 is rotated by an unillustrated driver in such a manner that an outer peripheral surface of the transfer roller 31 turns at the same turning speed as the outer peripheral surface of the photosensitive drum 21. An image transfer bias of a polarity opposite to the charging polarity of the photosensitive drum 21 and the toner is applied to the transfer roller 31 if necessary. Shown by an alternate long and two short dashed line in FIG. 2 is a path along which the printing sheet P is transported.

The cleaning unit 60 (toner storage device) is located downstream of the image transfer nipping part along the rotating direction of the photosensitive drum 21 as shown in FIG. 2. The cleaning unit 60 has a housing 61 incorporating a cleaning roller 62, a cleaning blade 63 and a toner discharging screw 64 (toner transporting screw) which is a rotary member. The cleaning roller 62 and the cleaning blade 63 are pressed against the photosensitive drum 21 for cleaning the outer peripheral surface of the photosensitive drum 21 by removing any material adhering to the surface of the photosensitive drum 21 including residual toner left thereon after the toner image has been transferred to the printing sheet P. The toner removed from the surface of the photosensitive drum 21 is once held in the housing 61 and discharged into an unillustrated waste toner collection container provided outside the cleaning unit 60.

The static charge eliminating unit 70 is provided with an LED 71. It is to be noted that another type of light source, such as an electroluminescent (EL) lamp or a fluorescent lamp, may be used instead of the LED 71. As the static charge eliminating unit 70 projects static charge eliminating light emitted from the LED 71 to the photosensitive drum 21, a static charge imparted to the surface of the photosensitive drum 21 is eliminated in preparation of a charging process in succeeding image forming operation.

Configured as thus far described, the printer 1 operates in the aforementioned manner. The bearing structure of the printer 1 of the present embodiment is for the toner discharging screw 64 (rotary member) of the cleaning unit 60 for cleaning the surface of the photosensitive drum 21.

Figure 3:
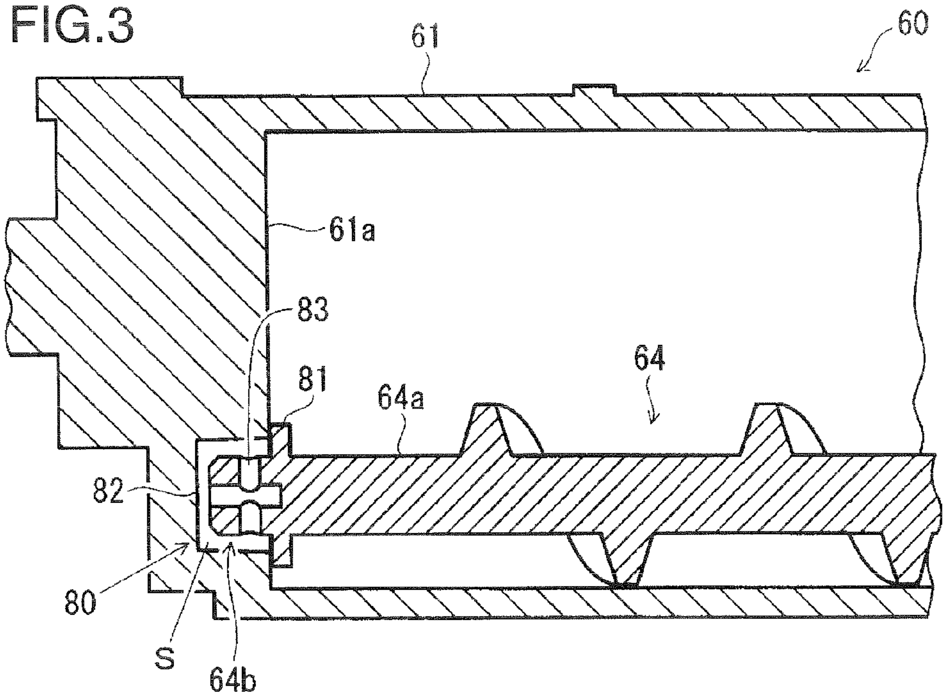
FIG. 3 is a fragmentary sectional side view showing a portion around a toner discharging screw of a cleaning unit shown in FIG. 2.
Figure 4:
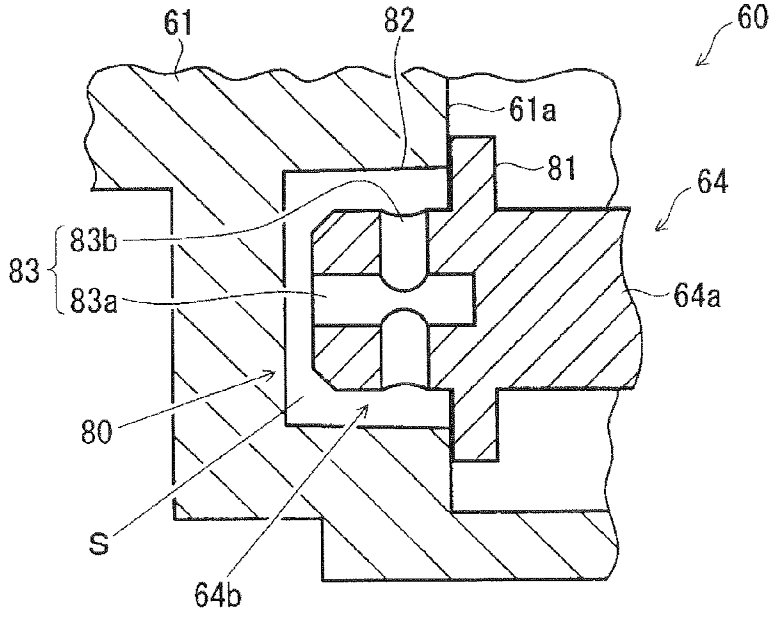
FIG. 4 is a fragmentary enlarged cross-sectional view showing the bearing structure of the toner discharging screw shown in FIG. 3.
Figure 5:
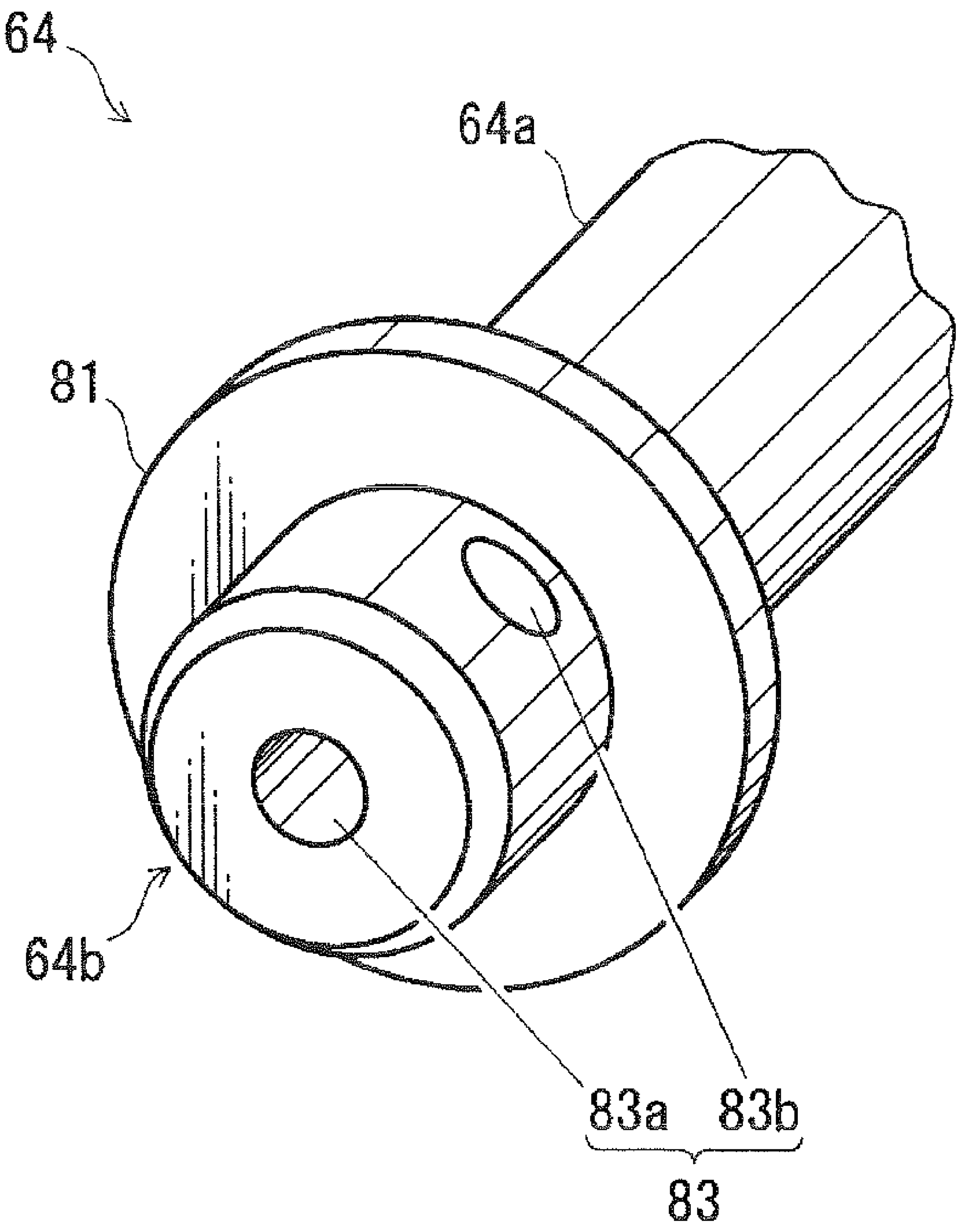
FIG. 5 is a fragmentary perspective view showing one end of a shaft of the toner discharging screw shown in FIG. 4.

The bearing structure of the embodiment is now described in great detail with reference to FIGS. 3 to 5 in addition to FIG. 2. FIG. 3 is a fragmentary sectional side view showing a portion around the toner discharging screw 64 of the cleaning unit 60, FIG. 4 is a fragmentary enlarged cross-sectional view showing the bearing structure 80 of the toner discharging screw 64, and FIG. 5 is a fragmentary perspective view showing one end of a shaft 64*a* (rotary shaft) of the toner discharging screw 64.

The toner discharging screw 64 provided in the cleaning unit 60 shown in FIGS. 2 and 3 is supported at both ends by the housing 61 and is caused to rotate by a driving force transmitted from an unillustrated end of the toner discharging screw 64. At the other end of the toner discharging screw 64 opposite to the aforementioned end from which the driving force is transmitted, the shaft 64*a* is rotatably supported by the housing 61 via the bearing structure 80.

As shown in FIGS. 3 to 5, the bearing structure 80 includes a flange 81, the shaft 64*a*, a shaft end portion 64*b* and lubricant filling holes 83 provided on the toner discharging screw 64, as well as a recess 82 and a wall surface 61*a* (wall portion/inside wall surface) provided on the housing 61. The flange 81 is formed on the end of the shaft 64*a* opposite to the end thereof from which the driving force is transmitted, projecting radially outward from the shaft 64*a*. The shaft end portion 64*b* is a portion of the shaft 64*a* projecting longitudinally outward beyond the flange 81 on a common axis with the shaft 64*a*. The lubricant filling holes 83 are holes formed in the shaft end portion 64*b* for retaining a lubricant. The recess 82 is a hollow portion formed in the housing 61 for accommodating the shaft end portion 64*b* of the toner discharging screw 64. The wall surface 61*a* is a portion of the housing 61 with which the flange 81 is placed in contact. In the bearing structure of the present embodiment, the recess 82 and the wall surface 61*a* together constitute a bearing.

The flange 81 is formed on the shaft 64*a* of the toner discharging screw 64 at a position located longitudinally inward from the shaft end portion 64*b*. The flange 81 is formed in a generally disk shape projecting radially outward from a cylindrical outer surface of the shaft 64*a* as depicted in FIG. 5. The flange 81 need not however have the disk shape. What is essential is that the flange 81 has a portion projecting radially outward from the shaft 64*a*.

The recess 82 is formed in the wall surface 61*a* of the housing 61 which supports the toner discharging screw 64. Formed by hollowing out part of the wall surface 61*a*, the recess 82 is a cylindrical cavity capable of accommodating the shaft end portion 64*b*, the recess 82 having an inside diameter smaller than the outside diameter of the flange 81. When the toner discharging screw 64 is supported by the wall surface 61*a*, an outer peripheral part of a side surface of the flange 81 is in close contact with the wall surface 61*a* as shown in FIGS. 3 and 4. In this condition, there is created a space S around the shaft end portion 64*b* of the shaft 64*a* between the shaft end portion 64*b* and inside surfaces of the recess 82 in areas located radially outward and longitudinally outward the shaft end portion 64*b*.

The lubricant filling holes 83 are formed in the shaft end portion 64*b* of the shaft 64*a*. Specifically, the lubricant filling holes 83 include a first hole 83*a* and a second hole 83*b* as depicted in FIG. 4. The first hole 83*a* is a cylindrical hole formed longitudinally inward from an end surface of the shaft end portion 64*b* on the common axis with the shaft 64*a* for a specific length. The second hole 83*b* is also a cylindrical hole formed from one point to an opposite point on a cylindrical outer surface of the shaft end portion 64*b* in a direction perpendicular to the longitudinal axis of the shaft 64*a*. The second hole 83*b* thus formed has two openings directed radially outward in opposite directions in the cylindrical outer surface of the shaft 64*a*. The first hole 83*a* and the second hole 83*b* intersects each other at a point on the longitudinal axis of the shaft 64*a* (64*b*) therewithin and are connected to each other.

The lubricant is filled into the lubricant filling holes 83 before the toner discharging screw 64 is mounted in the housing 61 during a process of assembling the cleaning unit 60. Grease having a relatively high viscosity is a preferable example of the lubricant. Without filling the lubricant into the recess 82, or into the space S shown in FIG. 4, the shaft end portion 64*b* of the shaft 64*a* is fitted into the recess 82 and the toner discharging screw 64 is mounted in the housing 61.

As thus far described, the bearing structure 80 of the present embodiment is a bearing structure supporting the toner discharging screw 64 rotatably about a rotary axis thereof, the bearing structure 80 including the flange 81, the lubricant filling holes 83 formed in the shaft end portion 64*b* of the shaft 64*a* and the cylindrically shaped recess 82 whose inside diameter is smaller than the outside diameter of the flange 81 for accommodating the shaft end portion 64*b*.

In this bearing structure, it is possible to fill the lubricant in the lubricant filling holes 83, and not in the recess 82, during the process of assembling the cleaning unit 60. As a result, the lubricant exhibits surface tension, and this makes it possible to prevent the lubricant from leaking out of the recess 82 before the cleaning unit 60 is used after the process of assembly. When the cleaning unit 60 is used during operation of the printer 1, the lubricant filled in the lubricant filling holes 83 is caused to flow out slowly from the lubricant filling holes 83 due to a centrifugal force exerted on the shaft 64*a* by the rotating toner discharging screw 64.

Since the bearing structure 80 of this embodiment does not employ any functional element like a ball bearing, it is possible to provide a compact and low-cost bearing structure. Also, since the lubricant is initially retained in the lubricant filling holes 83, it is possible to prevent the bearing structure 80 from running short of the lubricant due to leakage thereof from the recess 82 accommodating the shaft end portion 64*b* of the shaft 64*a*, so that satisfactory rotational performance of the toner discharging screw 64 (rotary member) is obtainable.

Furthermore, since the second hole 83*b* has the openings directed radially outward in the cylindrical outer surface of the shaft 64*a*, it is possible to allow the lubricant to flow out easily from the lubricant filling holes 83, so that the bearing structure 80 of the embodiment can quickly provide an improved lubricating effect at the beginning of use of the cleaning unit 60. It will be appreciated from the foregoing discussion that the present invention can provide the bearing structure 80 by which excellent rotational performance of the rotary member can be obtained.

While the invention has far been described with reference to the preferred embodiment thereof, the aforementioned arrangement of the embodiment is simply illustrative and may be modified in various ways without departing from the scope of the invention. Cited under (1) to (5) below are some examples of such modifications of the embodiment.

(1) The printer 1 of the foregoing embodiment is a monochrome printer using only black toner. The image forming apparatus of the invention is not limited to the monochrome printer but may be an image forming apparatus employing an intermediate transfer belt and a tandem engine or a rotary rack system for multicolor printing.

(2) Described thus far with reference to the preferred embodiment is an example in which the bearing structure of the invention is applied to the toner discharging screw 64 of the cleaning unit 60. The bearing structure of the invention is also applicable to other kinds of rotary members. The bearing structure of the invention is applicable to various other kinds of rotary members than the toner discharging screw 64 shown in FIG. 2, such as the cleaning roller 62 of the cleaning unit 60, the development roller 52, the transporting screw 53 and the agitating screw 54 of the developing unit 50 (which is an example of a toner storage device), a transporting screw or an agitating paddle provided in the toner feeding container 55 (which is another example of a toner storage device), as well as the photosensitive drum 21, the transfer roller 31 and the registration rollers 8 (FIG. 1). The bearing structure of the invention, if applied to such rotary members provided at various locations in the printer 1, will serve to smoothen sliding motion of shafts of these rotary members, enhance wear resistance thereof and prevent generation of unpleasant noise. Additionally, the bearing structure will serve also to prevent an increase in torque required for rotating the rotary members and lockup of rotation thereof caused by agglomeration or sticking of the toner.

(3) The invention is applicable not only to an image forming apparatus like a printer or to screws or roller-like members but also to a variety of bearing structures for supporting rotary members used in various apparatuses rotatably about respective rotary axes.

(4) The foregoing embodiment has illustrated an arrangement in which the lubricant filling holes 83 include the first hole 83*a* extending along the longitudinal axis of the shaft 64*a* and the second hole 83*b* extending perpendicular to the longitudinal axis of the shaft 64*a*. This is just one example of the arrangement of the invention. In one variation, the arrangement may not include the first hole 83*a*, for example. Also, while the second hole 83*b* extends perpendicular to the longitudinal axis of the shaft 64*a*, the second hole 83*b* may be a hole extending at an oblique angle to the longitudinal axis of the shaft 64*a*. Furthermore, there may be formed a plurality of holes arranged along a circumferential direction of the shaft end portion 64*b* instead of the second hole 83*b*. Alternatively, a ringlike groove formed in the cylindrical outer surface of the shaft end portion 64*b* along the circumferential direction thereof may be used as a lubricant filling hole.

(5) While the shaft end portion 64*b* of the shaft 64*a* of the toner discharging screw 64 is a cylindrical part as illustrated in the foregoing embodiment, the shaft end portion 64*b* may have a rectangular or D-shaped cross section. Also, while the recess 82 formed in the wall surface 61*a* of the housing 61 is a cylindrical cavity, the recess 82 need not necessarily be cylindrically shaped but may be a cavity of any shape if it is possible to accommodate the shaft end portion 64*b* therein. Even in this case, however, it is desirable that an opening of the recess 82 be sealed off by the flange 81, creating the generally closed space S in the recess 82.

While the invention has thus far been described with reference to the illustrative embodiment thereof, principal arrangements and features of the invention can be summarized as follows.

In one aspect of the invention, a bearing structure for a rotary member includes a rotary shaft provided in the rotary member, a flange formed at an end portion of the rotary shaft, the flange having a portion projecting radially outward from the rotary shaft, a shaft end portion projecting from the rotary shaft longitudinally outward beyond the flange, a lubricant filling hole formed in the shaft end portion, and a bearing supporting the rotary member rotatably about the rotary shaft, the bearing including a recess capable of accommodating the shaft end portion and a wall portion with which the flange is placed in contact.

In this bearing structure, it is possible to fill the lubricant in the lubricant filling hole, and not in the recess, during a process of installing the rotary member. As a result, the lubricant exhibits surface tension, and this makes it possible to prevent the lubricant from leaking out of the recess before the rotary member is used after the process of installation thereof.

When the rotary member is actually used, the lubricant filled in the lubricant filling hole is caused to flow out slowly from the lubricant filling hole due to a centrifugal force exerted on the rotary shaft by rotation of the rotary shaft. It is therefore possible to achieve a reduction in size and cost of the bearing structure. It is also possible to prevent leakage or shortage of the lubricant, so that the invention can provide a bearing structure capable of providing satisfactory rotational performance.

The aforementioned bearing structure of the invention should preferably be such that the flange has a disk shape and the recess is a cylindrical cavity whose inside diameter is smaller than the outside diameter of the flange. This makes it possible to reduce the flange and the recess in size.

Also, the bearing structure should preferably be such that the lubricant filling hole has an opening directed radially outward. This structure allows the lubricant to flow out easily from the lubricant filling hole due to the centrifugal force so that the bearing structure can quickly provide an improved lubricating effect at the beginning of operation of an apparatus. The invention can therefore provide a bearing structure capable of providing even satisfactory rotational performance.

Also, the bearing structure should preferably be such that the lubricant filling hole is a hole passing through the shaft end portion in a direction perpendicular to a longitudinal direction of the rotary shaft. This structure makes it possible to form the lubricant filling hole having two openings directed radially outward.

Also, the bearing structure should preferably be such that the lubricant filling hole includes a first hole formed in an end of the shaft end portion to a specific depth along the longitudinal direction of the rotary shaft and a second hole formed to pass through the shaft end portion in a direction perpendicular to a longitudinal direction of the rotary shaft, intersecting the first hole. This structure makes it possible to provide enhanced ease of filling the lubricant and improved retainability thereof.

Preferably, the aforementioned bearing structure of the invention further comprises a housing accommodating the rotary member, wherein the bearing is formed in an inside wall surface of the housing, the recess is formed by hollowing out part of the inside wall surface of the housing and the wall portion is part of the inside wall surface surrounding the recess. This structure makes it possible to form the bearing by using the inside wall surface of the housing.

In another aspect of the invention, a toner storage device includes a toner transporting screw having a rotary shaft and a screw portion which rotates about a longitudinal axis thereof as a result of rotation of the rotary shaft for transporting toner in a longitudinal direction, and a housing accommodating the toner transporting screw, wherein the rotary shaft has a flange having a portion projecting radially outward from the rotary shaft, a shaft end portion projecting longitudinally outward beyond the flange, and a lubricant filling hole formed in the shaft end portion, the housing having an inside wall surface facing the shaft end portion and a recess formed by hollowing out part of the inside wall surface of the housing for accommodating the shaft end portion, and wherein part of the flange is in contact with part of the inside wall surface surrounding the recess.

According to this structure of the toner storage device having the housing accommodating the toner transporting screw, it is possible to achieve a reduction in size and cost of the bearing structure capable of providing stable lubricating performance.

In one preferable mode of the invention, the toner storage device is a cleaning unit for cleaning an image carrying member, and the toner transporting screw is a toner discharging screw for discharging the toner from inside the housing. This makes it possible to configure a bearing structure of the toner discharging screw of the cleaning unit for cleaning the image carrying member in compact size and at low cost, still providing stable lubricating performance.

In still another aspect of the invention, an image forming apparatus includes an image carrying member on which a toner image is formed, and a toner storage device for storing toner. The toner storage device includes a toner transporting screw having a rotary shaft and a screw portion which rotates about a longitudinal axis thereof as a result of rotation of the rotary shaft for transporting the toner in a longitudinal direction, a flange formed at an end portion of the rotary shaft, the flange having a portion projecting radially outward from the rotary shaft, a shaft end portion projecting from the rotary shaft longitudinally outward beyond the flange, a lubricant filling hole formed in the shaft end portion, and a housing accommodating the toner transporting screw, the housing having an inside wall surface facing the shaft end portion and a recess formed by hollowing out part of the inside wall surface of the housing for accommodating the shaft end portion, wherein part of the flange is in contact with part of the inside wall surface surrounding the recess.

This application is based on Japanese patent application serial No. 2008-160339, filed in Japan Patent Office on Jun. 19, 2008, the contents of which is hereby incorporated by reference.

Although the present invention has been fully described by way of example with reference to the accompanied drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A bearing structure for a rotary member, said bearing structure comprising:

a rotary shaft provided in said rotary member;

a flange formed at an end portion of said rotary shaft, said flange having a portion projecting radially outward from said rotary shaft;

a shaft end portion projecting from said rotary shaft longitudinally outward beyond said flange;

a lubricant filling hole formed in said shaft end portion; and a bearing supporting said rotary member rotatably about said rotary shaft, said bearing including a wall portion and a recess with an opening at the wall portion and a closed depth end surface spaced from the opening, said shaft end portion being accommodated in the recess and said flange being in contact with the wall portion so that the recess is sealed off by said flange and defines a substantially closed space.

2. The bearing structure according to claim 1, wherein said flange has a disk shape and said recess is a cylindrical cavity whose inside diameter is smaller than the outside diameter of said flange.

3. The bearing structure according to claim 1, wherein said lubricant filling hole has an opening directed radially outward.

4. The bearing structure according to claim 3, wherein said lubricant filling hole is a hole passing through said shaft end portion in a direction perpendicular to a longitudinal direction of said rotary shaft.

5. The bearing structure according to claim 1, wherein said lubricant filling hole includes a first hole formed in an end of said shaft end portion to a specific depth along the longitudinal direction of said rotary shaft and a second hole formed to pass through said shaft end portion in a direction perpendicular to a longitudinal direction of said rotary shaft, intersecting the first hole.

6. The bearing structure according to claim 1 further comprising a housing accommodating said rotary member, wherein said bearing is formed in an inside wall surface of said housing, said recess is formed by hollowing out part of the inside wall surface of said housing and said wall portion is part of the inside wall surface surrounding said recess.

7. A toner storage device comprising:

a toner transporting screw having a rotary shaft and a screw portion which rotates about a longitudinal axis thereof as a result of rotation of the rotary shaft for transporting toner in a longitudinal direction;

a flange formed at an end portion of said rotary shaft, said flange having a portion projecting radially outward from said rotary shaft;

a shaft end portion projecting from said rotary shaft longitudinally outward beyond said flange;

a lubricant filling hole formed in said shaft end portion; and a housing accommodating said toner transporting screw, said housing having an inside wall surface facing said shaft end portion and a recess formed by hollowing out part of the inside wall surface of said housing so that said recess has an opening at the inside wall surface and a closed depth end surface spaced from the inside wall surface, said shaft end portion being accommodated in said recess with part of said flange being in contact with part of the inside wall surface surrounding said recess so that said opening of said recess is sealed off by said flange and defines a substantially closed space.

8. The toner storage device according to claim 7, wherein said toner storage device is a cleaning unit for cleaning an image carrying member, and said toner transporting screw is a toner discharging screw for discharging the toner from inside said housing.

9. An image forming apparatus comprising:

an image carrying member on which a toner image is formed; and a toner storage device for storing toner, said toner storage device including:

a toner transporting screw having a rotary shaft and a screw portion which rotates about a longitudinal axis thereof as a result of rotation of the rotary shaft for transporting the toner in a longitudinal direction;

a flange formed at an end portion of said rotary shaft, said flange having a portion projecting radially outward from said rotary shaft;

a shaft end portion projecting from said rotary shaft longitudinally outward beyond said flange;

a lubricant filling hole formed in said shaft end portion; and a housing accommodating said toner transporting screw, said housing having an inside wall surface facing said shaft end portion and a recess formed by hollowing out part of the inside wall surface of said housing so that said recess has an opening at the inside wall surface and a closed depth end surface spaced from the inside wall surface, said shaft end portion being accommodated in said recess with part of said flange being in contact with part of the inside wall surface surrounding said recess so that said opening of said recess is sealed off by said flange and defines a substantially closed space.

* * * * *